Jan. 12, 1954

L. W. BIRBAUM 2,665,790

CENTRIFUGALLY ENGAGED CLUTCH

Filed May 5, 1950

INVENTOR.
LESTER W. BIRBAUM
BY
John W. Michael
ATTORNEY

Patented Jan. 12, 1954

2,665,790

UNITED STATES PATENT OFFICE 2,665,790

CENTRIFUGALLY ENGAGED CLUTCH

Lester W. Birbaum, Oconomowoc, Wis., assignor to La Belle Industries, Inc., Oconomowoc, Wis., a corporation of Wisconsin Application May 5, 1950, Serial No. 160,308

3 Claims. (Cl. 192—105)

This invention relates to speed responsive clutches and particularly to provision of a clutch having a journal adapted to drivingly engage a shaft while being slidable along the shaft to permit adjustment of the position of the clutch on the shaft.

There are a number of tools wherein the driven shaft is preferably adjustable with respect to the motive power. For example, a portable engine or other motive power source may be adapted to drive a vertical shaft having a circular saw or other tool on the end thereof. The distance between the engine and the ground will remain substantially constant while the features of the terrain or other factors may dictate the use of the tool at different levels. It is desirable, therefore, to provide a driving connection between the engine and the shaft which will permit of movement of the shaft with respect to the engine. The engine employed frequently does not have sufficient power for the job until it reaches a relatively high speed. Therefore, it is also desirable to have the driving connection between the engine and the shaft permit the engine to attain its rated speed before engaging and driving the shaft. The present invention provides a speed responsive clutch mounted on a journal which drivingly engages a shaft and may be moved along the shaft axis when the engine is rotating below its rated speed.

An object of this invention, therefore, is to provide a speed responsive clutch for driving a shaft and permitting axial movement of the clutch with respect to the shaft or vice versa.

Another object is to provide a simple, compact centrifugal clutch in which the driving portion of the clutch is rotatable on a journal driven by the output portion of the clutch and adapted to drivingly and slidably engage a shaft.

Other objects and advantages will be pointed out in, or be apparent from, the specification and claims, as will obvious modifications of the single embodiment shown in the drawings, in which:

Figure 1:
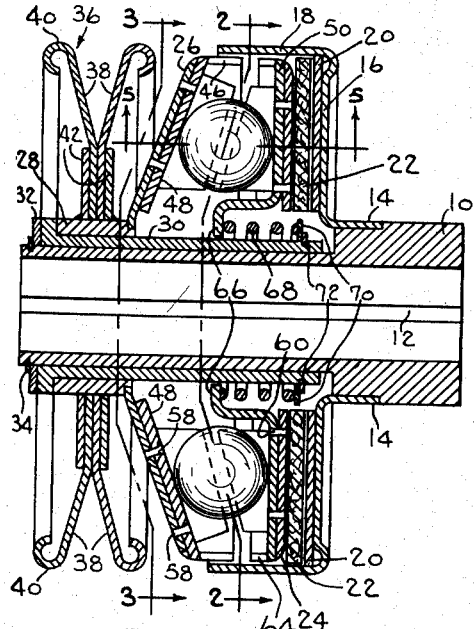
Fig. 1 is a vertical section through the clutch.
Figure 2:
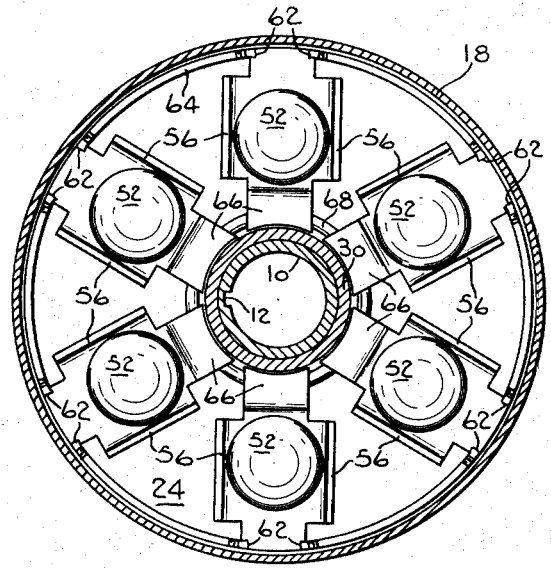
Fig. 2 is a section taken as indicated by line 2—2 in Fig. 1.
Figure 3:
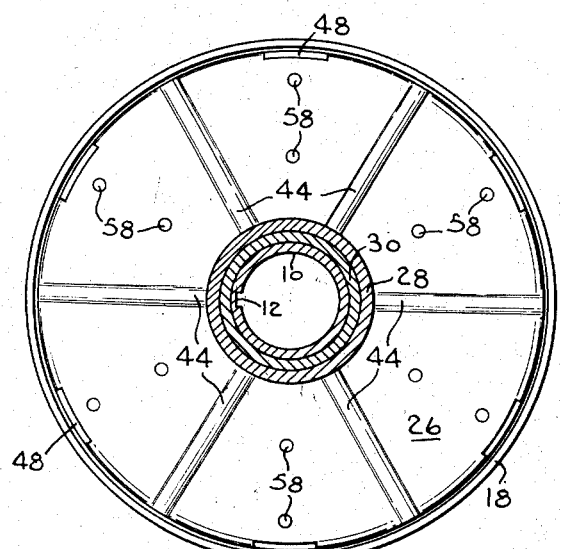
Fig. 3 is a section taken as indicated by line 3—3 in Fig. 1 to show the outside face of the driving plate of the clutch.
Figure 4:
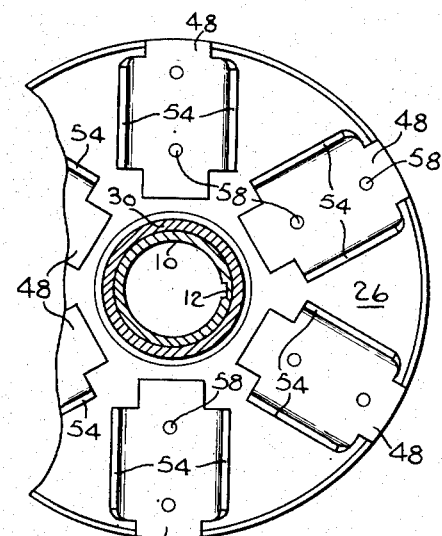
Fig. 4 is a fragmentary view of the inside of the driving clutch plate shown in Fig. 3.
Figure 5:
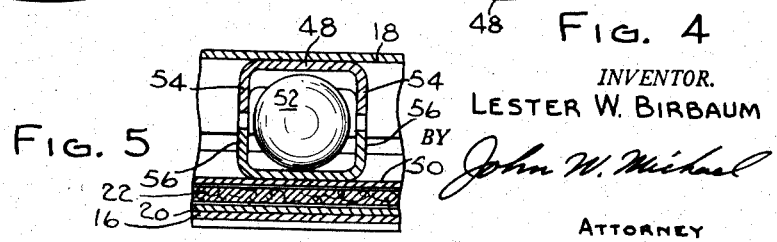
Fig. 5 is a section taken as indicated by line 5—5 in Fig. 1.

Referring to the drawings in detail, the entire clutch mechanism is mounted on a shaft or journal 10 which is provided with a keyway 12 for drivingly engaging a jack- or stub-shaft while permitting movement of the journal along the shaft. Of course, such movement is simplified if the journal 10 is not rotating. As will appear more fully hereinafter, when the driving portion of the clutch is below its rated speed, the journal 10 will idle, not rotate. The cylindrical sleeve portion 14 of housing 16 is welded or brazed to journal 10 for rotation with the journal. Housing 16 includes a generally cylindrical flange 18 adapted to enclose the majority of the clutch parts. The inside of housing 16 is provided with a flat facing plate 20 which is adapted to be frictionally engaged and driven by floating friction disc 22 when the driven clutch plate 24 is moved to the right (Fig. 1) upon the drive plate 26 attaining its rated speed.

Drive plate 26 is brazed to sleeve 28 rotatably mounted on bearing 30 carried by shaft 10. Bearing 30 is retained on the journal by means of washer 32 held in place by retaining ring 34. A V-belt sheave 36 comprising similar plates 38, 38 having rolled edges 40, 40 and centrally stiffened by annular members 42, 42 is welded or brazed to sleeve 28 to turn the driving plate 26. Driving plate 26 is generally frustoconical to provide an outwardly converging space between the driving and driven plates. The drive plate 26 is stiffened by means of radial ribs 44 and the peripheral flange 46.

The driving connection between plate 26 and plate 24 is obtained by means of engagement of channels 48, 50 with balls 52. Thus the sides 54, 54 of each channel 48 on driving plate 26 engage the sides of the balls 52 while the sides 56, 56 of channels 50 on driven plate 24 similarly engage the balls. In addition to engaging the balls to transmit rotation of the driving plate to the driven plate, the channels cooperate to confine the movement of the balls to a radial path relative to the plates as they move outwardly under the influence of centrifugal force.

Each channel 48 on drive plate 26 is secured to the plate by means of rivets 58, 58. Each driven channel 50 is secured to plate 24 by means of rivet 60 and ears 62 struck from flange 64 of plate 24 to overlie the radial extension of the channel where it projects through cooperating notches to the periphery of the plate. The channels employed on both plates are hardened steel to provide "true" runways for the balls without requiring hardening of the plates per se while preventing galling or indenting the relatively soft plates. If the driving and driven plates were to be hardened, considerable warpage would result and costly machining and grinding operations would become necessary to "true" the surfaces to the necessary accuracy.

Each driven channel 50 includes a formed tongue 66 which cooperates with bearing 30 to center the driven plate with respect to the axis of the assembly. The tongues also serve as seats for the balls when the clutch is at rest and the balls are at their innermost position. In addition, tongues 66 serve as a seat for spring 68 compressed between the tongues and washer 70 held on bearing 30 by means of retaining ring 72. The spring acts on the driven plate to urge it toward the left (Fig. 1) against the action of the balls as they are thrown outwardly by centrifugal force. Thus in the structure shown the spring rate may be increased to increase the speed at which the clutch will engage or may be decreased to decrease the rated speed.

Variations in the engaging speed may also be obtained by changing the size of the balls. If smaller ball bearings or fewer ball bearings are employed, the rated speed of the clutch will be increased. The present design permits of ready adaptation of the particular needs of the job since the size of the channels may be varied to conform to any desired size of ball. Similarly the simple design permits of the use of various springs without changing other parts of the structure.

In operation the sheave 36 is driven by an engine or other power source (not shown) to rotate the drive plate 26 and, through the channel and ball connection, the driven plate 50. Upon the engine attaining the predetermined speed, balls 52 will be thrown radially outwardly against the force of spring 68 to force the driven plate 24 away from the driving plate 26 (to the right in Fig. 1) and sandwich friction disc 22 between driven plate 24 and housing facing plate 20. This will cause the housing to rotate the journal 10 which in turn engages the shaft. If the engine speed is decreased below the rated clutch speed, spring 68 will force balls 52 inwardly to disengage the clutch and permit journal 10 to stop rotating. The journal may at this time be moved along the shaft or the shaft may be moved with respect to the journal.

The details of the construction of the plates and the use of channels on the plates to serve as runways for the balls as well as acting as a seat for the spring are claimed in my co-pending application Serial No. 160,307.

It will be appreciated that this invention need not necessarily take the form shown. Therefore, I do not wish to be limited by the detailed description and it should be understood the invention is to be limited only by the scope of the claims.

I claim:

1. A speed responsive clutch comprising, a journal adapted to engage a shaft, a clutch housing fixed on said journal, a bearing on said journal, a frusto-conical drive plate mounted on said bearing for rotation with respect to said journal, a driven plate between said drive plate and said housing, a plurality of balls between said plates, means on each plate for engaging said balls to transmit motion from the drive plate to the driven plate and to restrict movement of the balls to a substantially radial path relative to said plates as the balls move outwardly under influence of centrifugal force, a friction disc between said driven plate and the housing to drive the housing when the driven plate is forced against the disc as the balls move outwardly, and spring means acting on said driven plate to oppose the action of centrifugal force.

2. A speed responsive clutch comprising, a journal adapted to engage a shaft, a clutch housing fixed on said journal, a bearing on said journal, a sheave adapted to be driven by a power source and being mounted on said bearing for rotation with respect to said journal, a frusto-conical drive plate mounted on said bearing and connected to said sheave for rotation therewith, a driven plate between said drive plate and said housing, a plurality of balls between said plates, means on each plate for engaging said balls to transmit motion from the drive plate to the driven plate and to restrict movement of the balls to a substantially radial path relative to said plates as the balls move outwardly under influence of centrifugal force, a friction disc between said driven plate and the housing to drive the housing when the driven plate is forced against the disc as the balls move outwardly, and spring means acting on said driven plate to oppose the action of centrifugal force.

3. A speed responsive clutch comprising, a journal adapted to receive a shaft, a clutch member fixed on the journal, a bearing on the journal, a frusto-conical drive plate mounted on said bearing for rotation with respect to said journal, a driven plate between said drive plate and said member, a plurality of balls between said plates, channels on each of said plates for engaging said balls and confining outward movement of the balls to a substantially radial path relative to said plates when the drive plate is rotated, outward movement of said balls being operative to move said driven plate toward said member, a friction disc between said driven plate and said member to cause rotation of the member and the journal, said channels on said driven plate being provided with tongues journaling the plate on the bearing, a seat on the bearing, and a spring coiled around the bearing and compressed between said seat and said tongues to urge the driven plate away from the member.

LESTER W. BIRBAUM.

References Cited in the file of this patent

UNITED STATES PATENTS

| Number | Name | Date |
|---|---|---|
| 979,595 | Stuhldreier | Dec. 27, 1910 |
| 1,254,863 | Suther | Jan. 29, 1918 |
| 1,623,236 | Roo | Apr. 5, 1927 |
| 1,678,638 | Dunham | July 31, 1928 |
| 1,859,334 | Karle | May 24, 1932 |
| 2,460,539 | Shank | Feb. 1, 1949 |

FOREIGN PATENTS

| Number | Country | Date |
|---|---|---|
| 492,532 | Great Britain | Sept. 22, 1938 |
| 630,872 | Great Britain | Oct. 24, 1949 |
| 609,413 | France | Aug. 14, 1926 |